United States Patent [19]

Masuda

[11] Patent Number: 4,763,197
[45] Date of Patent: Aug. 9, 1988

[54] CHARGE DETECTING CIRCUIT

[75] Inventor: Shinji Masuda, Tokyo, Japan

[73] Assignee: NEC Corporation, Japan

[21] Appl. No.: 891,354

[22] Filed: Jul. 28, 1986

[30] Foreign Application Priority Data

Jul. 26, 1985 [JP] Japan .................................. 60-166477

[51] Int. Cl.⁴ .............................................. H04N 3/14
[52] U.S. Cl. ........................... 358/213.16; 358/213.15
[58] Field of Search ...................... 358/213.15–213.18, 358/213.31, 294

[56] References Cited

U.S. PATENT DOCUMENTS 4,293,877 10/1981 Tsunekawa et al. ............ 358/213.16
4,484,223 11/1984 Tsunekawa .................... 358/213.16
4,562,475 12/1985 Levine ............................ 358/213.15

FOREIGN PATENT DOCUMENTS

52-57718 5/1977 Japan ............................. 358/213.15

Primary Examiner—Jin F. Ng
Assistant Examiner—Stephen Brinich
Attorney, Agent, or Firm—Laff, Whitesel, Conte & Saret

[57] ABSTRACT

A charge detecting circuit includes a plurality of photodiodes, and a first multiplexer having a plurality of inputs connected to the photodiodes, respectively and operative to selectively connect one of its inputs to its output. Further, there are provided dummy capacitors of the same number as that of the photodiodes, each of the dummy capacitors having substantially the same capacitance as one corresponding photodiode, and a second multiplexer having a plurality of inputs connected to the dummy capacitors respectively, and operative to connect one of its inputs to its output. A differential amplifier is connected at its first input to the output of the first multiplexer and at its a second input to the output of the second multiplexer, so as to generate a photodetection signal.

33 Claims, 3 Drawing Sheets

CHARGE DETECTING CIRCUIT

BACKGROUND OF THE INVENTION

1. Field of the Invention

The present invention relates to charge detecting circuits, and more specifically to detecting-driving circuits for use in linear image sensors.

2. Description of related art

Conventionally, a typical linear image sensor includes a plurality of photodetectors such as photodiodes arrayed in a straight line. These photodetectors are connected to corresponding inputs of a multiplexer whose output is connected to an output amplifier. This amplifier ordinarily includes an integration capacitor and an on-off switch connected in parallel between the input and the output of the amplifier, so as to form an integration amplifier for converting an input current signal to an output voltage signal.

With the above linear image sensor, the multiplexer is operated to scan the photodetector array, so that the photodetectors are sequentially read out and outputted through the output amplifier. In this reading operation, after each photodetector is read out, the on-off switch of the integration amplifier is turned on to short-circuit the integration capacitor, so that the residual electric charge in each photodetector is cleared through the on-off switch.

In this conventional linear image sensor, however, scanning noises or feed-through noises are inevitably generated, which will greatly decrease the signal-to-noise ratio when the detected signal is very weak.

Further, a wiring capacitance is formed in a lead extending from the output of the multiplexer to the input of the amplifier, and in addition, since the multiplexer is composed of a plurality of analog switches such as transistor switches, the multiplexer itself has a parasitic capacitance. These wiring capacitance and the parasitic capacitance will hold a portion of the electric charge generated in each photodetector when the photodetector is connected to the output of the multiplexer to be read by the amplifier, and will continue to retain the above charge even after the photodetector is separated from the output of the multiplexer. As a result, the charge retained in the wiring and parasitic capacitances is mixed with a charge generated in another photodetector when the second photodetector is connected to the output of the multiplexer to be read by the amplifier. This mixing of charges will decrease the sharpness of a image reproduced on the basis of a photodetection signal detected by the image sensor.

The above mentioned residual charge retained in the wiring capacitance and the parasitic capacitance is discharged through the on-off switch connected between the input and the output of the integration amplifier when the on-off switch is turned on. However, since the amplifier has a substantial output impedance, the dischargeof the residual charge will need a relative long time of period. This means that for sharp reproduction image the on-off switch in parallel to the amplifier has to be maintained in on condition for a long time at each time one photodetector is read out. This results in decrease of the scanning speed for the multiplexer.

The above mentioned problems have been encountered not only in the linear image sensor but also in the other detecting circuits which include an array of detectors each responsive to a physical property.

SUMMARY OF THE INVENTION

Accordingly, it is an object of the present invention to provide a detecting circuit which has dissolved the above mentioned drawbacks of the conventional detecting circuit.

Another object of the present invention is to provide a detecting circuit free from the influence of so-called feed-through noise caused by the switching operation of the multiplexer.

Still another object of the present invention is to provide a charge detecting circuit which can quickly discharge a residual electric charge in the wiring capacitance and the parasitic capacitance of the multiplexer, so as to prevent mixing of electric charges in different detecting elements.

A further object of the present invention is to provide a charge detecting circuit which can forcedly discharge a residual electric electric charge in the wiring and parasitic capacitances immediately after each detecting element is read out, so that a detection operation is performed at a high speed.

A still further object of the present invention is to provide a linear image sensor drive circuit capable of scanning an image at a high speed and of generating a photodetection signal which allows reproduction of a sharp image.

The above and other objects of the present invention is accomplished in accordance with the present invention by a detecting circuit comprising:

a plurality of detecting elements each responsive to a physical property to generate an electrical signal;

a multiplexer having a plurality of inputs connected to the detecting elements, respectively and operative to selectively connect one of its inputs to its output;

at least one dummy element having substantially the same impedance as the detecting elements;

selecting means having at least one input connected to the dummy element and operative to selectively connect the input to its output in synchronism with the switching operation of the multiplexer; and a differential amplifier, preferably a differential integrator having a first input connected to the output of the multiplexer and a second input connected to the output of the selecting means, and operative to generate a detection signal.

With the above mentioned circuit, the dummy element gives a reference level to the difference amplifier. Further, since the selecting means between the dummy element and the differential amplifier is switched in synchronism with the switching operation of the multiplexer, the multiplexer and the selecting means will simultaneously generate feed-through noises in phase, which are fed to the two inputs of the differential amplifier. Therefore, the feed-through noises are canceled each other in the differential amplifier. As a result, a even weak signal of the detecting element can be detected at a high signal-to-noise ratio without influence of feed-through noises.

The above detecting circuit preferably includes dummy elements, for example dummy capacitors, of the same number as that of the detecting elements, for example photodiodes. Each of the dummy elements has substantially the same impedance as one corresponding detecting element. In this case, the selecting means is constituted of a second multiplexer having a plurality of inputs connected to the dummy elements, respectively and operative to selectively connect one of its inputs to its output. Further, the first and second multiplexers are operated in synchronism so that when one of the detecting elements is selected and connected to the output of the first multiplexer, one dummy element corresponding to the selected detecting element is selected and connected to the output of the second multiplexer.

In a specific embodiment, the charge detecting circuit further includes: a first isolation switch connected between the output of the first multiplexer and the first input of the differential integrator; a second isolation switch connected between the output of the second multiplexer and the second input of the differential integrator; and a bias voltage source connected through a first preconditioning switch to the output of the first multiplexer and also connected through a second preconditioning switch to the output of the second multiplexer. The first and second isolation switches and the first and second preconditioning switches are operated in synchronism in such a manner that the first and second isolation switches assume the same on-off condition and the first and second preconditioning switches assume the same on-off condition which is opposite to that of the first and second isolation switches.

Further, the differential integrator is of the differential output type and has a first integration capacitor connected between the first input and a corresponding first output thereof and a second integration capacitor connected between the second input and a corresponding second output thereof. The differential integrator also has a first short-circuiting switch connected in parallel to the first integration capacitor and a second short-circuiting switch connected in parallel to the second integration capacitor. These first and second short-circuiting switches are operated in synchronism to assume the same on-off condition.

More specifically, the first multiplexer has a first group of analog on-off switches of the same number as that of the detecting elements. Each of the analog on-off switches is connected at its end to one corresponding detecting element, and the other ends of all the analog switches are connected in common to the output of the first multiplexer. Further, the second multiplexer has a second group of analog on-off switches of the same number as that of the dummy elements. Each of the second group analog on-off switches is connected at its end to one corresponding dummy element, and the other ends of all the second group analog switches are connected in common to the output of the second multiplexer. In addition, there is provided a scanning circuit for sequentially driving the first and second groups of analog switches in synchronism in such a manner that when one of the first group analog switches is put in on condition, a corresponding one of the second group analog switches is also put in on condition and the other switches of the first and second group analog switches are maintained in off condition.

With this arrangement, it can be so constructed that the detecting elements and the associated first group analog switches are in electrical symmetry to the dummy elements and the associated second analog switches. Therefore, when one of the first group analog switches is selected and turned on and at the same time the corresponding one of the second group analog switches is also selected and turned on, the electrical impedance from the detecting element selected by the turned-on first group analog switch to the first input of the differential integrator can be substantially the same as that from the dummy element selected by the correspondingly turned-on second group analog switch to the second input of the differential amplifier. Namely, the circuit can have a complete differential structure, and so, the feed-through noise can be perfectly canceled.

In the mentioned embodiment, there is preferably provided a means for controlling the scanning circuit, the first and second short-circuiting switches, the first and second isolation switches and the first and second preconditioning switches in such a manner that in a first half of each period one first group analog switch and the corresponding one second group analog switch are put in on condition, the first and second short-circuiting switches and the first and second preconditioning switches are in off condition and the first and second isolation switches are in on condition, and in the second half of the above mentioned period, the first and second short-circuiting switches and the first and second preconditioning switches are in on condition and the first and second isolation switches are in off condition.

According to another aspect of the present invention, there is provided a charge detecting circuit comprising:
a plurality of charge storage type detecting elements;
a multiplexer having a plurality of inputs connected to the detecting elements, respectively and operative to selectively connect one of its inputs to its output;
a bias voltage source connected through a preconditioning switch to the output of the multiplexer;
an isolation switch connected at its one end to the output of the multiplexer, the isolation switch being adapted to be turned on when the preconditioning switch is turned off and to be turned off when the preconditioning switch is turned on; and
an amplifier having an input connected to the other end of the isolation switch and operative to generate a charge detection signal.

With the above arrangement, during each period one detecting element is selected by the multiplexer, the isolation switch is firstly turned on so that the selected detecting element is read out by the amplifier, and then, the isolation switch is turned off and the preconditioning switch is turned on, so that the selected detecting element is charged by the bias voltage. Namely, the residual electric charge in the detecting element and the associated circuit element and wiring from the detecting element to the isolation switch is forcedly neutralized. Therefore, when another detecting element is selected, the charge in the detected element can be read out without mixing with any residual charge.

Further, since the impedance of the preconditioning switch in on condition is greatly lower than the output impedance of the amplifier, the parasitic capacitance of the detecting element and the multiplexer and the wiring capacitance between the multiplexer and the isolation switch can be quickly neutralized through the preconditioning switch from the bias voltage source, so that the detecting elements can be scanned at a high speed. Namely, the operation speed of the detecting circuit can be greatly improved.

In one embodiment of the above mentioned detecting circuit, the amplifier has an integration capacitor connected between its input and its output so as to form an integration amplifier. The amplifier also has a short-circuiting switch connected in parallel to the integration capacitor. Further, the detecting circuit includes means for controlling the short-circuiting switch, the isolation switch and the preconditioning switch in such a manner that in a first half of each period the multiplexer connects one of its inputs to its output, the short-circuiting switch and the preconditioning switch are in off condition and the isolation switch is in on condition, and in the second half of the above mentioned period, the short-circuiting switch and the preconditioning switch are in on condition and the isolation switch is in off condition.

In a preferred embodiment, the charge detecting circuit further includes: at least one dummy element having substantially the same impedance as the detecting elements; a second preconditioning switch connected between the bias voltage source and the dummy element; and a second isolation switch connected at its one end to the dummy element. In addition, the amplifier is a differential amplifier having a first input connected to the output of the multiplexer and a second input connected to the other end of the second isolation switch, and operative to generate a charge detection signal. In this case, the first and second isolation switches and the first and second preconditioning switches are operated in synchronism in such a manner that when the first and second isolation switches assume the same on-off condition, the first and second preconditioning switches assume the same on-off condition which is opposite to that of the first and second isolation switches.

In a specific embodiment of the charge detecting circuit, there are provided dummy elements of the same number as that of the detecting elements, each of the dummy elements having substantially the same impedance as one corresponding detecting element. The detecting circuit further includes a second multiplexer having a plurality of inputs connected to the dummy elements, respectively and operative to selectively connect one of its inputs to its output. In this case, the first and second multiplexers are operated in synchronism so that when one of the detecting elements is selected and connected to the output of the first multiplexer, one dummy element corresponding to the selected detecting element is selected and connected to the output of the second multiplexer.

Preferably, the detecting elements are a plurality of photodiodes arrayed to form a linear image sensor, and each of the dummy elements is a capacitor having a capacitance substantially equal to that of a corresponding photodiode.

Further, according to a third aspect of the present invention, there is provided a charge detecting circuit comprising:

a plurality of charge storage type detecting element;

a multiplexer having a plurality of inputs connected to the detecting elements, respectively and operative to selectively connect one of the inputs to its output;

dummy elements of the same number as that of the detecting elements, each of the dummy elements having substantially the same impedance as one corresponding detecting element;

a second multiplexer having a plurality of inputs connected to the dummy elements, respectively and operative to selectively connect one of its inputs to its output;

the first and second multiplexers being operated in synchronism so that when one of the detecting elements is selected and connected to the output of the first multiplexer, one dummy element corresponding to the selected detecting element is selected and connected to the output of the second multiplexer;

a differential amplifier having a first input connected to the output of the multiplexer and a second input connected to the output of the selecting means, and operative to generate a charge detection signal;

a bias voltage source;

a first isolation switch connected between the output of the first multiplexer and the first input of the differential amplifier;

a first preconditioning switch connected between the bias voltage source and the output of the first multiplexer;

a second isolation switch connected between the output of the second multiplexer and the second input of the differential amplifier; and a second preconditioning switch connected between the bias voltage source and the output of the second multiplexer, the first and second isolation switches and the first and second preconditioning switches being operated in synchronism in such a manner that when the first and second isolation switches assume the same on-off condition, the first and second preconditioning switches assume the same on-off condition which is opposite to that of the first and second isolation switches.

The above and other objects, features and advantages of the present invention will become apparent from the following detailed description of the preferred embodiment of the present invention with reference to the accompanying drawings.

BRIEF DESCRIPTION OF THE DRAWING

FIG. 4 is a timing chart illustrating the on-off of the respective analog switches used in the circuit shown in

DESCRIPTION OF THE PREFERRED EMBODIMENT

Figure 1:
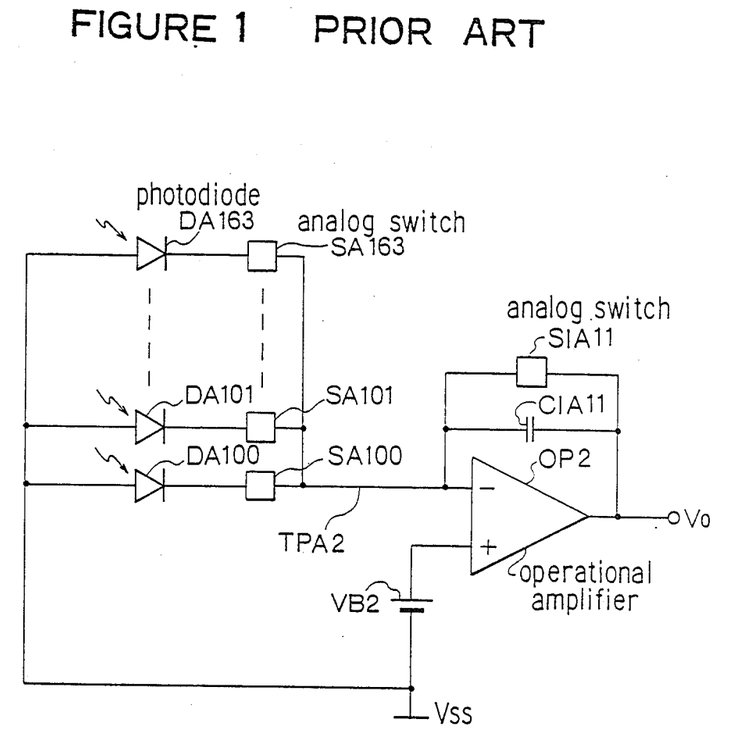
FIG. 1 is a schematic circuit diagram of a conventional linear image sensor drive circuit.

Referring to FIG. 1, there is shown a circuit schematic diagram of a conventional linear image sensor drive circuit.

The linear image sensor drive circuit shown in the figure includes a plurality of photodiodes DA 100 to DA 163 arrayed to form a linear image sensor. These photodiodes DA 100 to DA 163 are respectively connected through a plurality of analog switches SA 100 to SA 163 to the inverting input of an operational amplifier OP 2. Therefore, if one of the analog switches SA 100 to SA 163 is selectively turned on, one of the photodiodes DA 100 to DA 163 is selected and connected to the inverting input of the amplifier OP 2. In other words, the plurality of analog switches SA 100 to SA 163 constitute an analog multiplexer.

Figure 2:
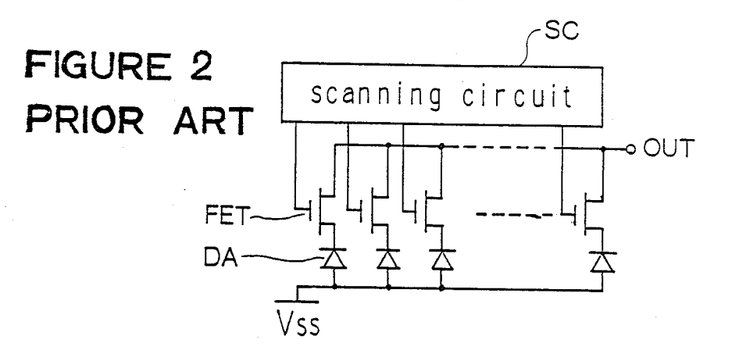
FIG. 2 is a circuit diagram showing the analog switches associated to the array of photodiodes shown in FIG. 1.

Specifically, each of the analog switches is constituted of a transistor switch, particularly an insulated gate field effect transistor FET as shown in FIG. 2. These transistors FET have a drain-source path which is connected at its end to an associated photodiode DA and at its other end to a common output OUT which gives the output of the multiplexer. Each of the transistors FET is connected at its gate to a scanning circuit SC so that the transistors FET are sequentially turned on one by one, with the result that the photodiodes DA are selectively connected one by one to the output OUT.

An integration capacitor CIA 11 is connected between the inverting input and the output of the operational amplifier OP 2. An analog switch SIA 11 is also connected in parallel with the capacitor CIA 11. The positive terminal of a bias voltage source VB 2 is connected to the non-inverting input of the operational amplifier OP 2 to supply a bias voltage to the operational amplifier. The negative terminal of the bias voltage source VB is connected to the photodiodes DA 100 to DA 163. The operational amplifier OP 2, the integration capacitor CIA 11 and the analog switch SIA 11 can be assembled in an integration circuit.

The linear image sensor drive circuit constructed as mentioned above operates in the following manner.

During a first time period, the analog switches SA 100 to SA 163 are all in off condition, and the analog switch SIA 11 is in on condition. In this condition, the amount of charge in the integration capacitor CIA 11 is zero because both ends of the capacitor CIA 11 is short-circuited by the analog switch SIA 11. As a result, the output voltage Vo of the operational amplifier OP 2 yields zero. During a second time period, the analog switch SIA 11 is turned off and the analog switch SA 100 is turned on to select the output of the photodiode DA 100. The charge generated in the photodiode DA 100 subject to an optical input is then transferred to the amplifier OP. The corresponding voltage to the above charge is generated at both ends of the integration capacitor CIA 11, and consequently the same voltage Vo can be obtained as a charge detection signal.

In the conventional detecting circuit mentioned above, the so-called feed-through noise is inevitable which is generated when each of analog switches SA 100 to SA 163 is turned off. This feed-through noise will cause such a significant problem that the signal-to-noise ratio is greatly decreased in case of detecting particularly a very small amount of charge.

The analog switches SA 100 to SA 163 are solid state device switches, typically transistor switches as mentioned above, and therefore, each of the analog switches has an internal parasitic capacitance. In addition, the lead from each analog switch to the amplifier OP 2 has a wiring capacitance. In other words, the analog switches SA 100 to SA 163 are equivalently connected to the amplifier OP 2 throough a nodal point TPA 2 including the aforementioned parasitic capacitance and wiring capacitance. Thus, when one of the photodiodes DA 100 to DA 163 is selected and connected through one analog switch to the amplifier OP 2, the capacitance of the nodal point TPA 2 will hold a portion of the charge generated in the selected photodiode, and the partial charge will continue to be retained in the capacitance of the nodal point TPA 2 even after the selected photodiode is separated from the nodal point TPA 2.

This residual charge will be discharged through the analog switch SIA 11 when it is turned on. This residual charge becomes large if the charge generated in the photodetector is large, and on the other hand, the discharge speed of the residual charge is limited by the output impedance of the amplifier OP 2. Therefore, if the residual charge is large, it cannot be quickly discharged or neutralized because of the output impedance of the amplifier. If the residual charge on the nodal point TPA 2 is not completely neutralized before another photodiode is connected to the nodal point TPA 2 and hence the amplifier OP 2, the electric charge in the second photodiode is mixed with the residual charge, and the mixed charge is read out by the amplifier. For example, in the case of reading the photodiode DA 101 after reading of the photodiode DA 100, a portion of the charge which was generated in the photodiode DA 100 may happen to be mixed into the charge generated by the photodiode DA 101. However, if the operation speed of the detecting circuit, particularly the scanning speed of the photodetectors is set so that the residual charge on the nodal point TPA 2 has been already substantially neutralized at each time the photodetectors are selectively connected to the nodal point TPA 2, a high speed detection cannot be expected.

Figure 3:
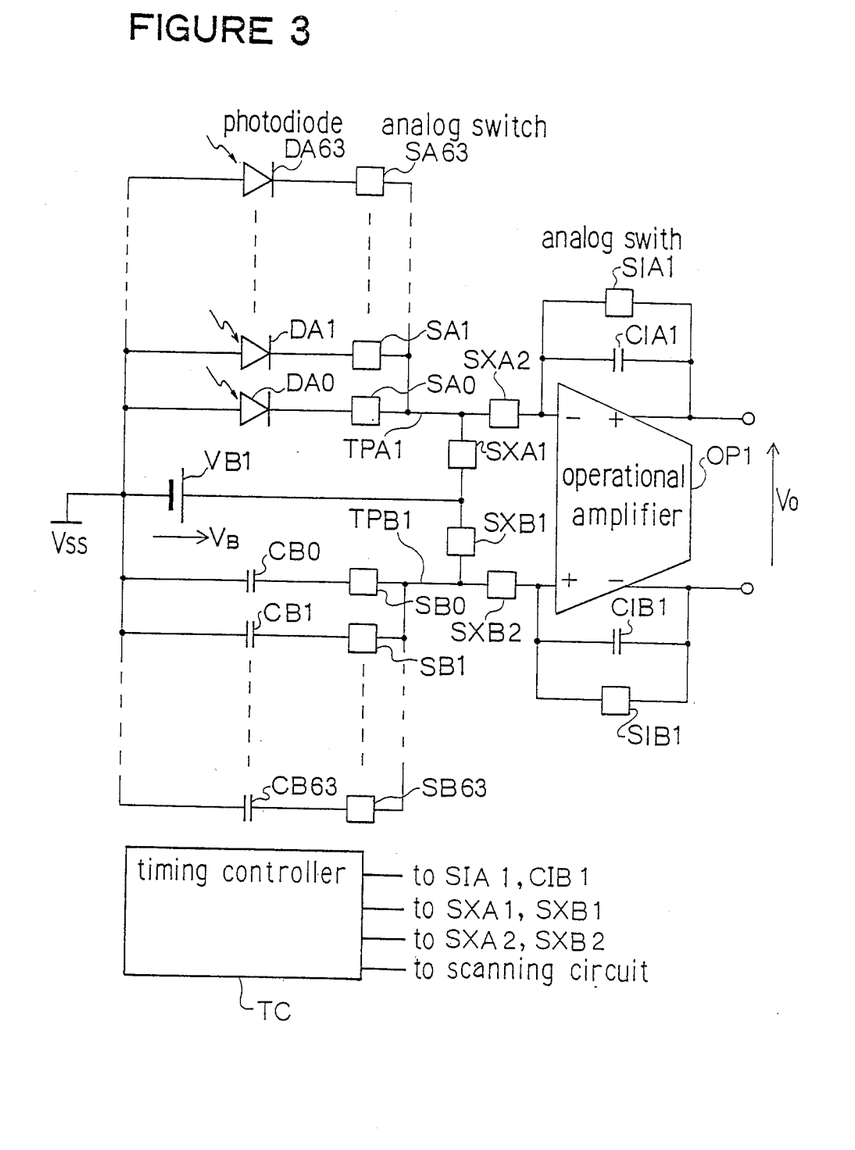
FIG. 3 is a schematic circuit diagram of a charge detecting circuit in accordance with the present invention.

Turning to FIG. 3, there is shown a circuit diagram of a linear image sensor driving circuit in accordance with the present invention.

The circuit shown in FIG. 3 comprises a plurality of charge storage type photodetectors, for example a plurality of photodiodes DA 0 to DA 63. These photodiodes DA 0 to DA 63 are grounded at their anodes and are respectively connected at their cathodes through a corresponding number of analog switches SA 0 to SA 63 to a nodal point TPA 1. Namely, the analog switches constitute an analog multiplexer for selectively connecting one of the photodiodes to nodal point TPA 1.

The shown circuit furthermore comprises a plurality of dummy capacitors CB 0 to CB 63, each of which has the same capacitance as the reverse direction junction capacitance of the corresponding photodiode. Each of these capacitors CB 0 to CB 63 is grounded at its end and is connected through an associated analog switch SB 0 to SB 63 to another nodal point TPB 1. These analog switches SB 0 to SB 63 constitute another analog multiplexer for selectively connecting one of the dummy capacitors to the nodal point TPB 1. The above analog switches SA 0 to SA 63 as well as the analog switches SB 0 to SB 63 can be formed of transistor switches as shown in FIG. 2, and are sequentially and synchronously turned on one by one by a scanning circuit SC as shown in FIG. 2, so that one of the analog switches SA 0 to SA 63 and a corresponding one of the analog switches SB 0 to SB 63 are simultaneously turned on while maintaining or brining the other analog switches SA and SB in or into off condition.

Further, the photodiodes DA 0 to DA 63 and the associated analog switches SA 0 to SA 63 are located in electrical symmetry to the dummy capacitors CB 0 to CB 63 and the associated analog switches SB 0 to SB 63, so that the electrical impedance from one photodiode Da to the nodal point TPA 1 is substantially the same as the impedance from a corresponding dummy capacitor CB to the nodal point TPB 1.

The nodal point TPA 1 is connected to the inverting input terminal of a differential output type differential amplifier OP 1 through an analog switch SXA 2. The nodal point TPB 1 is connected to the non-inverting input terminal of the operational amplifier OP 1 through an analog switch SXB 2.

An analog switch SIA 1 and an integration capacitor CIA 1 are connected in parallel between the inverting input terminal and the corresponding non-inverting output terminal of the operational amplifier OP 1. Further, an analog switch SIB 1 and an integration capacitor CIB 1 are connected in parallel between the non-inverting input terminal and the inverting output terminal of the operational amplifier OP 1. The capacitance of the capacitor CIA 1 is the same as that of the capacitor CIB 1. Thus, a differential integration amplifier is formed.

Further, there is provided a bias voltage source VB 1 connected at its positive terminal through an analog switch SXA 1 to the nodal point TPA 1 and through another analog switch SXB 1 to the nodal point TPB 1. The negative terminal of the bias voltage source VB 1 is grounded.

In addition, a timing controller TC is provided to control the on-off operation of the analog switches SA 0 to SA 63, SB 0 to SB 63, SIA 1 nd SIB 1, SXA 1 and SXB 1, and SXA 2 and SXB 2. Specifically, the timing controller TC is adapted to directly control the scanning circuit which selectively turn on the analog switches SA 0 to SA 63 and SB 0 to SB 63, so that these switches are turned on and off under an indirect control of the timing controller.

Explanation will be made on operation of the linear image sensor driving circuit according to the present invention constructed as mentioned above, with reference to FIG. 4 illustrating an on-off timing chart of the respective analog switches used in the circuit of FIG. 3.

Figure 4:
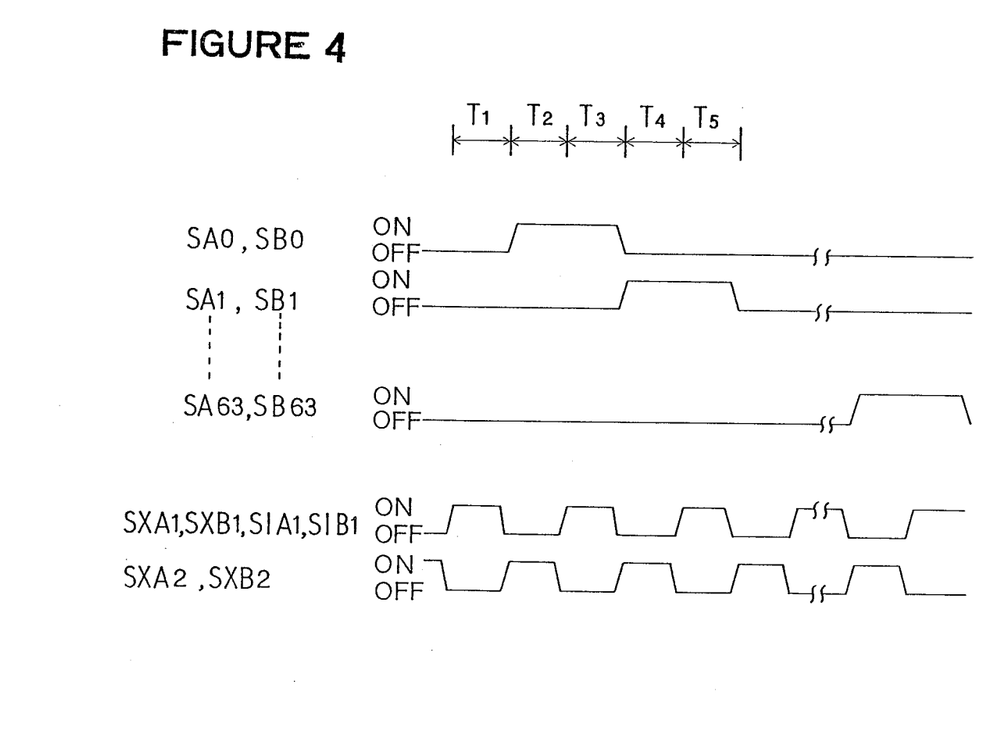

During the time period T1, the timing controller TC operates to the effect that the analog switches SA 0 to SA 63, SB 0 to SB 63, SXA 2 and SXB 2 are in off condition; on the contrary, the analog switches SXA 1, SXB 1, SIA 1 and SIB 1 are in on condition. During this time period, the integration capacitors CIA 1 and CIB 1 are short-circuited, and therefore, the output voltage Vo is zero. Nodal points TPA 1 and TPB 1 having substantial parasitic capacitances and wiring capacitances, respectively, are connected to the bias voltage source VB 1 through the analog switches SXA 1 and SXB 1, so that these capacitances are charged at the same voltage as the bias voltage source.

During the time period T2, the timing controller TC controls so that the analog switch SA 0 and SB 0 are turned on; SA 1 to SA 63 and SB 1 to SB 63 stay in off condition; SXA 1, SXB 1, SIA 1 and SIB 1 are turned off; and SXA 2 and SXB 2 are turned on. During this timer period, the output of the photodiode DA 0 is connected to the inverting input of the integration amplifier through the analog switch SXA 2. The output of the dummy capacitor CB 0 is connected to the non-inverting input of the integration amplifier through the analog switch SXB 2. Charge generated in the photodiode DA 0 is transferred to the integration amplifier, and so, the integration capacitor CIA 1 produces a voltage corresponding to the above charge. But, since the dummy capacitor CB 0 generates no charge, the integration capacitor CIB 1 produces no voltage. Thus, a charge detection signal can be obtained as the output voltage Vo between the non-inverting output and the inverting output.

During the time period T3, the controller TC controls so that the analog switches SA 0 and SB 0 stay in on condition; SA 1 to SA 63 and SB 1 to SB 63 stay in off condition; but, SXA 1, SXB 1, SIA 1 and SIB 1 turn on; and SXA 2 and SXB 2 turn off. During this time period, the inverting input and the non-inverting output of the amplifier OP 1 are short-circuited. Also, the non-inverting input and the inverting output are short-circuited. The charge of the integration capacitors CIA 1 and CIB 1 become, therefore, zero and consequently the output voltage reveals zero. Simultaneously, the photodiode DA 0 and the nodal point TPA 1 are charged or neutralized by the bias voltage source VB 1 through the analog switch SXA 1, and the nodal point TPB 1 is charged by the bias voltage source VB 1.

During the succeeding time periods T4 and T5, SA 1 and SB 1 turn on; SA 0 and SB 0 turn off; and SA 2 to SA 63 and SB 2 to SB 63 stay in off condition. During these time periods, SXA 1, SXB 1, SIA 1, SIB 1, SXA 2 and SXB 2 are turned on and off similarly to those analog switches during the time peridos T2 and T3, so that DA 1 nd CB 1 are read out during the period T4 and then neutralized similarly to DA 0 and CB 0 during the time period T3. Such an operation could be repeated as to every photodiode.

As seen from the above explanation, the disclosed embodiment of the present invention comprises the dummy capacitors CB 0 to CB 63 corresponding to the photodiodes DA 0 to DA 63, and furthermore, includes the dummy analog switches SB 0 to SB 63 corresponding to the analog switches SA 0 to SA 63. In addition, the differential amplifier is of the differential output type. Thus, the overall circuit has a construction of totally-differential type. Therefore, the feed-through noise generated by the analog switches SA 0 to SA 63 and the feed-through noise generated by the analog switches SB 0 to SB 63 are substantially the same in magnitude and in phase, and so, are canceled each other in the differential amplifier. As a result, a photo detection signal corresponding to the charge generated in only the selected photodiode can be obtained as the output voltage Vo.

By this canceling of the feed-through noise, the charge detecting circuit in accordance with the present invention has succeeded in detecting a very small amount of charge, such as 0.1 picocoulomb at a signal-to-noise ratio of more than 30 db.

Furthermore, in the above embodiment, the photodiodes are charged by the bias voltage source VB 1 through the analog switch SXA 1 for example during the periods $T_3$ and $T_5$ after the charge generated in a photodiode has been transferred to the integration circuit. Impedance of the analog switch SXA 1 in on condition is normally lower than output impedance of the operational amplifier. The residual charge in the parasitic capacitance and the wiring capacitance associated to the nodal point TPA 1 can, therefore, neutralized so promptly that the operation speed of the circuit may be greatly improved. The reading speed per one element in the present invention was improved to be 1 microsecond though that of the conventional circuit is 10 microseconds.

In addition, the integration amplifier is isolated from the parasitic capacitance and the wiring capacitance associated to the analog multiplexer at each time the photodiode is read out. Accordingly, the operation speed of the integration amplifier can be greatly increased independently of the these parasitic capacitance and the wiring capacitance.

The invention has thus been shown and described with reference to specific embodiments. However, it should be noted that the invention is in no way limited to the details of the illustrated structures but changes and modifications may be made within the scope of the appended claims.

I claim:
1. A detecting circuit comprising:
a plurality of detecting elements each responsive to a physical property to generate an electrical signal;
a multiplexer having a plurality of inputs connected to the detecting elements, in a one-to-one relation- ship and operative to selectively connect one of its inputs to its output;

at least one dummy element having substantially the same impedance as the detecting elements;

selecting means having at least one input connected to the dummy element and operative to selectively connect the input to its output in synchronism with the switching operation of the multiplexer; and a differential amplifier having a first input connected to the output of the multiplexer and a second input connected to the output of the selecting means, and operative to generate a detection signal.

2. A detecting circuit as claimed in claim 1 wherein the multiplexer has a number of analog on-off switches which is the same as the number of the detecting elements, each of the analog on-off switches being connected at its end to one corresponding detecting element, the other ends of all the analog switches being connected in common to the first input of the differential amplifier; and further including a scanning circuit for sequentially driving the analog switches in such a manner that when one of the analog switches is put into an on condition, the other analog switches are maintained in an off condition.

3. A dtecting circuit as claimed in claim 2 wherein each of the analog switches comprises a transistor switch.

4. A detecting circuit as claimed in claim 1 wherein there are a number of dummy elements which is the same as the number of the detecting elements, each of the dummy elements having substantially the same impedance as one corresponding detecting element, and wherein the selecting means is a second multiplexer having a plurality of inputs connected to the dummy elements, in a one-to-one relationship and operative to selectively connect one of its inputs to its output, the first and second multiplexers being operated in synchronism so that when one of the detecting elements is selected and connected to the output of the first multiplexer, one dummy element corresponding to the selected detecting element is selected and connected to the output of the second multiplexer.

5. A detecting circuit as claimed in claim 4 wherein the detecting elements are a plurality of photodiodes arrayed to form a linear image sensor, and each of the dummy elements is a capacitor having a capacitance substantially equal to that of a corresponding photodiode.

6. A detecting circuit as claimed in claim 4 wherein the differential amplifier is of the differential output type and has a first integration capacitor connected between the first input and a corresponding first output thereof and a second integration capacitor connected between the second input and a corresponding second output thereof, thereby forming a differential integrator which generates the detection voltage signal between the first and second outputs.

7. A detecting circuit as claimed in claim 6 wherein the differential integrator also has a first short-circuiting switch connected in parallel to the first integration capacitor and a second short-circuiting switch connected in parallel to the second integration capacitor, the first and second short-circuiting switches being operated in synchronism to assume the same on-off condition.

8. A detecting circuit as claimed in claim 7 further including:

a bias voltage source;

first selection switch means connected to the output of the first multiplexer, the first input of the differential integrator and the bias voltage source, and operative to alternatively connect the output of the first multiplexer to one of the first input of the differential integrator and the bias voltage source; and second selection switch means connected to the output of the second multiplexer, the second input of the differential integrator and the bias voltage source, and operative to alternatively connect the output of the second multiplexer to one of the second input of the differential integrator and the bias voltage source;

the first and second selection switch means being operated in synchronism in such a manner that when the first selection switch means connects the output of the first multiplexer to the first input of the differential integrator, the second selection switch means connects the output of the second multiplexer to the second input of the differential integrator, and when the first selection switch means connects the output of the first multiplexer to the bias voltage source, the second switch means also connects the output of the second multiplexer to the bias voltage source.

9. A charge detecting circuit as claimed in claim 8 wherein the first selection switch means includes a first isolation switch connected between the output of the first multiplexer and the first input of the differential integrator, and a first preconditioning switch connected between the bias voltage source and the output of the first multiplexer; and wherein the second selection switch means includes a second isolation switch connected between the output of the second multiplexer and the second input of the differential integrator, and a second preconditioning switch connected between the bias voltage source and the output of the second multiplexr;

the first and second isolation switches and the first and second preconditioning switches being operated in synchronism in such a manner that when the first and second isolation switches assume the same on-off condition, the first and second preconditioning switches assume the same on-off condition which is opposite to that of the first and second isolation switches.

10. A charge detecting circuit as claimed in claim 9 further including means for controlling the first and second short-circuiting switches, the first and second isolation switches and the first and second preconditioning switches in such a manner that in a first half of each period the first multiplexer connects one of its inputs to its output, the first and second short-circuiting switches and the first and second preconditioning switches are in off condition and the first and second isolation switches are in on condition, and in the second half of the above mentioned period, the first and second short-circuiting switches and the first and second preconditioning switches are in on condition and the first and second isolation switches are in off condition.

11. A detecting circuit as claimed in claim 10 wherein the first multiplexer has a first group of analog on-off switches of the same number as that of the detecting elements, each of the analog on-off switches being connected at its end to one corresponding detecting element, the other ends of all the analog switches being connected in common to the output of the first multiplexer;

wherein the second multiplexer has a second group of analog on-off switches of the same number as that of the dummy elements, each of the analog on-off switches being connected at its end to one corresponding dummy element, the other ends of all the analog switches being connected in common to the output of the second multiplexer; and further including a scanning circuit for sequentially driving the first and second groups of analog switches in synchronism in such a manner that when one of the first group analog switches is put in on condition, a corresponding one of the second group analog switches is also put in on condition and the other switches of the first and second group analog switches are maintained in off condition.

12. A detecting circuit as claimed in claim 11 wherein the analog switches are transistor switches, respectively.

13. A detecting circuit as claimed in claim 11 wherein the control means controls the scanning circuit, the first and second short-circuiting switches, the first and second isolation switches and the first and second preconditioning switches in such a manner that in a first half of each period one first group analog switch and the corresponding one second group analog switch are put in on condition, the first and second short-circuiting switches and the first and second preconditioning switches are in off condition and the first and second isolation switches are in on condition, and in the second half of the above mentioned period, the first and second short-circuiting switches and the first and second preconditioning switches are in on condition and the first and second isolation switches are in off condition.

14. A detecting circuit as claimed in claim 1 wherein the differential amplifier is of the differential output type and has a first integration capacitor connected between the first input and a corresponding first output thereof and a second integration capacitor connected between the second input and a corresponding second output thereof, thereby forming a differential integrator which generates the detection voltage signal between the first and second outputs.

15. A detecting circuit as claimed in claim 14 wherein the differential integrator also has a first short-circuiting switch connected in parallel to the first integration capacitor and a second short-circuiting switch connected in parallel to the second integration capacitor, the first and second short-circuiting switches being operated in synchronism to assume the same on-off condition.

16. A detecting circuit as claimed in claim 15 further including:

a first isolation switch connected between the output of the first multiplexer and the first input of the differential integrator;

a second isolation switch connected between the output of the selecting means and the second input of the differential integrator; and a bias voltage source connected through a first preconditioning switch to the output of the first multiplexer and also connected through a second preconditioning switch to the output of the selecting means, the first and second isolation switches and the first and second preconditioning switches being operated in synchronism in such a manner that when the first and second isolation switches assume the same on-off condition, the first and second preconditioning switches assume the same on-off condition which is opposite to that of the first and second isolation switches.

17. A detecting circuit as claimed in claim 16 further including means for controlling the first and second short-circuiting switches, the first and second isolation switches and the first and second preconditioning switches in such a manner that in a first half of each period the multiplexer connects one of its inputs to its output, the first and second short-circuiting switches and the first and second preconditioning switches are in off condition and the first and second isolation switches are in on condition, and in the second half of the above mentioned period, the first and second short-circuiting switches and the first and second preconditioning switches are in on condition and the first and second isolation switches are in off condition.

18. A detecting circuit as claimed in claim 17 wherein the detecting elements are a plurality of photodiodes arrayed to form a linear image sensor, and the dummy element is a capacitor having a capacitance substantially equal to an average capacitance of the photodiodes, whereby the differential integrator generates a photodetection signal between the first and second outputs.

19. A charge detecting circuit comprising:

a plurality of charge storage type detecting elements;

a multiplexer having a number of analog on-off switches which is the same as the number of the detecting elements, each of the analog on-off switches being connected at its end to one corresponding detecting element, the other ends of all the analog on-off switches being connected in common to form an output of the multiplexer;

a bias voltage source connected through a preconditioning switch to the output of the multiplexer;

an isolation switch connected at its one end to the output of the multiplexer;

an amplifier having an input connected to the other end of the isolation switch and operative to generate a charge detection signal; and a timing controller for controlling the respective onoff analog switches of the multiplexer so as to sequentially turn on the on-off analog switches in such a way than when one of the on-off analog switches is put in an on condition, the other onoff analog switches are maintained in an off condition, the timing controller means also controlling the preconditioning switch and the isolation switch in such a manner that in each period that one of the on-off analog switches is in the on condition, first, the isolation switch is put into an on condition and the preconditioning switch is put into an off condition so that a charge of a detecting element connected to the on-off analog switch in the on condition is transferred to the amplifier, and thereafter the preconditioning switch is put into an on condition and the isolation switch is put into an off condition so that the same detecting element is charged by the bias voltage source.

20. A charge detecting circuit as claimed in claim 19 wherein the amplifier has an integration capacitor connected between its input and its output so as to form an integration amplifier.

21. A charge detecting circuit comprising:
a plurality of charge storage type detecting elements;
a multiplexer having a plurality of inputs connected to the detecting elements, respectively and operative to selectively connect one of its inputs to its output;
a bias voltage source connected through a preconditioning switch to the output of the multiplexer;
an isolation switch connected at its one end to the output of the multiplexer, the isolation switch being adapted to be turned on when the preconditioning switch is turned off and to be turned off when the preconditioning switch is turned on;
an amplifier having an integrating capacitor connected between its input and its output so as to form an integration amplifier and having an input connected to the other end of the isolation switch and operative to generate a charge detection signal, wherein the amplifier also has a short-circuiting switch connected in parallel with the integration capacitor; and further including means for controlling the short-circuiting switch, the isolation switch and the preconditioning switch in a manner such that in a first half of each period the multiplexer connects one of its inputs to its output, the short-circuiting switch and the preconditioning switch are in an off condition and the isolation switch is in an on condition, and in the second half of the above mentioned period, the short-circuiting switch and the preconditioning switch are in an on condition and the isolation switch is in an off condition.

22. A charge detecting circuit comprising:
a plurality of charge storage type detecting elements;
a first multiplexer having a plurality of inputs connected to the detecting elements, respectively and operative to selectively connect one of its inputs to its output,
a bias voltage source connected through a first preconditioning switch to the output of the first multiplexer;
a first isolation switch connected at its one end to the output of the first multiplexer, the first isolation switch being adapted to be turned on when the first preconditioning switch is turned off and to be turned off when the first preconditioning switch is turned on;
an amplifier having an input connected to the other end of the first isolation switch and operative to generate a charge detection signal;
at least one dummy element having substantially the same impedance as the detecting elements;
a second preconditioning switch connected at its one end to the dummy element; and
A second isolation switch connected at its one end to the dummy element; and
wherein the amplifier is a differential amplifier having a first input connected to the output of the first multiplexer and a second input connected to the other end of the second isolation switch, and operative to generate a charge detection signal;
the first and second isolation switches and the first and second preconditioning switches being operated in synchronism in such a manner that when the first and second isolation switches assume the same on-off condition, the first and second preconditioning switches assume the same on-off condition which is opposite to the on-off condition of the first and second isolation switches.

23. A charge detecting circuit as claimed in claim 22 wherein the differential amplifier is of the differential output type and has a first integration capacitor connected between the first input and a corresponding first output thereof and a second integration capacitor connected between the second input and a corresponding second output thereof, thereby forming a differential integrator which generates the charge detection signal between the first and second outputs.

24. A charge detecting circuit as claimed in claim 23 wherein the differential integrator also has a first short-circuiting switch connected in parallel to the first integration capacitor and a second short-circuiting switch connected in parallel to the second integration capacitor, the first and second short-circuiting switches being operated in synchronism to assume the same on-off condition.

25. A charge detecting circuit as claimed in claim 24 further including means for controlling the first and second short-circuiting switches, the first and second isolation switches and the first and second preconditioning switches in such a manner that in a first half of each period the multiplexer connects one of its input to its output, the first and second short-circuiting switches and the first and second preconditioning switches are in off condition and the first and second isolation switches are in on condition, and in the second half of the above mentioned period, the first and second short-circuiting switches and the first and second preconditioning switches are in on condition and the first and second isolation switches and in off condition.

26. A charge detecting circuit as claimed in claim 25 wherein the detecting elements are a plurality of photodiodes arrayed to form a linear image sensor, and the dummy element is a capacitor having a capacitance substantially equal to an average capacitance of the photodiodes.

27. A charge detecting circuit as claimed in claim 25 wherein there are provided dummy elements of the same number as that of the detecting elements, each of the dummy elements having substantially the same impedance as one corresponding detecting element, and further including a second multiplexer having a plurality of inputs connected to the dummy elements, respectively and operative to selectively connect one of its inputs to its output, the first and second multiplexers being operated in synchronism so that when one of the detecting elements is selected and connected to the output of the first multiplexer, one dummy element corresponding to the selected detecting element is selected and connected to the output of the second multiplexer.

28. A charge detecting circuit as claimed in claim 27 wherein the detecting elements are a plurality of photodiodes arrayed to form a linear image sensor, and each of the dummy elements is a capacitor having a capacitance substantially equal to that of a corresponding photodiode.

29. A charge detecting circuit comprising:
a plurality of charge storage type detecting element;
a first multiplexer having a plurality of inputs connected to the detecting elements, respectively and operative to selectively connect one of the inputs to its output;
dummy elements of the same number as that of the detecting elements, each of the dummy elements having substantially the same impedance as one corresponding detecting element;

a second multiplexer having a plurality of inputs connected to the dummy elements, respectively and operative to selectively connect one of its inputs to its output;

the first and second multiplexers being operated in synchronism so that when one of the detecting elements is selected and connected to the output of the first multiplexer, one dummy element corresponding to the selected detecting element is selected and connected to the output of the second multiplexer;

a differential amplifier having a first input connected to the output of the multiplexer and a second input connected to the output of the selecting means, and operative to generate a charge detection signal;

a bias voltage source;

a first isolation switch connected between the output of the first multiplexer and the first input of the differential amplifier;

a first preconditioning switch connected between the bias voltage source and the output of the first multiplexer;

a second isolation switch connected between the output of the second multiplexer and the second input of the differential amplifier; and a second preconditioning switch connected between the bias voltage source and the output of the second multiplexer, the first and second isolation switches and the first and second preconditioning switches being operated in synchronism in such a manner that when the first and second isolation switches assume the same on-off condition, the first and second preconditioning switches assume the same on-off condition which is opposite to that of the first and second isolation switches.

30. A charge detecting circuit as claimed in claim 29 wherein the differential amplifier is of the differential output type and has a first integration capacitor connected between the first input and a corresponding first output thereof and a second integration capacitor connected between the second input and a corresponding second output thereof, thereby forming a differential integrator which generates the charge detection voltage signal between the first and second outputs.

31. A charge detecting circuit as claimed in claim 30 wherein the differential integrator also has a first short-circuiting switch connected in parallel to the first integration capacitor and a second short-circuiting switch connected in parallel to the second integration capacitor, the first and second short-circuiting switches being operated in synchronism to assume the same on-off condition.

32. A charge detecting circuit as claimed in claim 31 further including means for controlling the first and second short-circuiting switches, the first and second isolation switches and the first and second preconditioning switches in such a manner that in a first half of each period the first multiplexer connects one of its inputs to its output, the first and second short-circuiting switches and the first and second preconditioning switches are in off condition and the first and second isolation switches are in on condition, and in the second half of the above mentioned period, the first and second short-circuiting switches and the first and second preconditioning switches are in on condition and the first and second isolation switches are in off condition.

33. A charge detecting circuit as claimed in claim 32 wherein the detecting elements are a plurality of photodiodes arrayed to form a linear image sensor, and each of the dummy elements is a capacitor having a capacitance substantially equal to that of a corresponding photodiode.

* * * * *